United States Patent
Mori et al.

(10) Patent No.: US 9,623,730 B2
(45) Date of Patent: Apr. 18, 2017

(54) DOOR ATTACHMENT PORTION STRUCTURE AND MANUFACTURING METHOD OF DOOR ATTACHMENT PORTION OF VEHICLE

(71) Applicant: MAZDA MOTOR CORPORATION, Hiroshima (JP)

(72) Inventors: Nobuyuki Mori, Higashihiroshima (JP); Ikuko Naganori, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/824,976

(22) Filed: Aug. 12, 2015

(65) Prior Publication Data

US 2016/0082814 A1 Mar. 24, 2016

(30) Foreign Application Priority Data

Sep. 19, 2014 (JP) ................................ 2014-190789

(51) Int. Cl.
  *B60J 5/04* (2006.01)
  *E06B 3/34* (2006.01)
  *E05D 15/00* (2006.01)
  *B62D 25/04* (2006.01)

(52) U.S. Cl.
  CPC ............. *B60J 5/0468* (2013.01); *B60J 5/047* (2013.01); *B62D 25/04* (2013.01); *E05D 15/00* (2013.01); *E06B 3/34* (2013.01)

(58) Field of Classification Search
  CPC ......... B62D 25/04; B60J 5/0468; B60J 5/047; E05D 15/00; E06B 3/34
  See application file for complete search history.

(56) References Cited

U.S. PATENT DOCUMENTS

2013/0133771 A1* 5/2013 Richardson ............... F16L 9/00
138/109

FOREIGN PATENT DOCUMENTS

JP EP 2371678 A1 * 10/2011 ............. B60J 5/042
JP 2013-141928 A 7/2013

* cited by examiner

*Primary Examiner* — Glenn Dayoan
*Assistant Examiner* — Melissa A Black
(74) *Attorney, Agent, or Firm* — Studebaker & Brackett PC (57) ABSTRACT

A hinge pillar reinforcement, a front door, and a hinge bracket are provided. The hinge bracket includes a hinge attachment wall portion, a pair of front-and-rear vertical wall portions, a pair of upper-and-lower lateral wall portions, a pair of front-and-rear vertical flange portions respectively extending inward, an upper lateral flange portion including an upper resilient portion and extending upward from an inward end portion of the upper lateral wall portion, and a lower lateral flange portion including a lower resilient portion and extending downward from an inward end portion of the lower lateral wall portion. The pair of vertical flange portions are joined to a front wall portion and a rear wall portion of the pillar reinforcement, and the upper lateral flange portion and the lower lateral flange portion are joined to the pillar reinforcement.

9 Claims, 9 Drawing Sheets

DOOR ATTACHMENT PORTION STRUCTURE AND MANUFACTURING METHOD OF DOOR ATTACHMENT PORTION OF VEHICLE

BACKGROUND OF THE INVENTION

The present invention relates to a door attachment portion structure and a manufacturing method of a door attachment portion of a vehicle which comprises a hinge bracket for attaching a door hinge to a pillar member.

Conventionally, a hinge pillar and a front pillar which interconnect, in a vertical direction, a front end portion of a roof side rail extending in a longitudinal direction (a side end portion of a front header) and a front end portion of a side sill extending in the longitudinal direction are provided at a side portion of a vehicle body. The front pillar is provided to be continuous to an upper end of the hinge pillar. Since the hinge pillar forms a front-side portion of a periphery of an ingress/egress opening for passengers, a pair of upper-and-lower door hinges which support a front door so that the front door can open or close the ingress/egress opening for passengers are attached to a hinge pillar reinforcement via a hinge attachment portion.

In a case in which there exists an attaching error of the front door to the vehicle body, the continuity of a design face of the front door and a design face of a fender panel are damaged, thereby causing deterioration of the product marketability, such as product. In general, since the hinge attachment portion for attaching the door hinge is formed integrally with a pillar member (a pillar outer panel or a pillar reinforcement) provided on a vehicle-body side, an attaching error of the door hinge, i.e., the attaching error of the front door is restrained to a minimum.

A side vehicle-body structure of a vehicle disclosed in Japanese Patent Laid-Open Publication No. 2013-141928 comprises a hinge pillar including a pillar outer panel having a front wall face and a pillar inner panel which form a closed cross section extending vertically, a pillar reinforcement provided in the above-described closed cross section and including a slant face, and a guide means for guiding the front wheel rearward and outward in a vehicle collision. A hinge attachment portion which includes a flat-shaped hinge attachment wall portion on an outward side in the vehicle width direction is formed integrally at the pillar reinforcement, and a holding tool for attaching the door hinge to the pillar reinforcement is arranged inside the pillar reinforcement.

There is a need to provide the pillar member and the hinge attachment portion as separate parts (components) which are formed separately from each other for the purpose of improving the vehicle design or the design's flexibility or the like. However, in a case in which the hinge attachment portion is configured by the hinge bracket which is formed separately from the pillar member, a component tolerance of the hinge bracket may be accumulated at an attachment position of the hinge bracket, in addition to an existing component tolerance of the hinge bracket. Consequently, the attaching error of the door hinge increases, so that there is a concern that an attachment accuracy of the door hinge may deteriorate improperly.

Further, in a case in which the hinge bracket is joined to the pillar member by using a spot welding device, there is also a concern that a working (processing) error may occur at the hinge bracket because of pressing of the spot welding device. That is, since a welding portion of the hinge bracket which has been positioned through a pressing contact operation by electrodes of the spot welding device is pressed against a pillar-member side at the welding, a specified extensional deformation of a pressing direction occurs at the welding portion. Meanwhile, since the pressing contact operation by the electrodes is released when the welding is complete, a specified shrinking deformation of an anti-pressing direction occurs at the welding portion because of spring back. A difference between the extensional deformation of the pressing direction and the shrinking deformation of the anti-pressing direction causes the working (processing) error at the welding.

In a case in which the component tolerance and the working error caused by the welding (hereafter, referred to as "error and the like") influence the attachment position of the hinge bracket in the longitudinal direction or in the vertical direction when the hinge bracket is attached to the pillar member, such error and the like can be eliminated (solved) by using an adjusting mechanism in which a bolt-hole size of the door hinge is set to be slightly greater than a bolt size for fixedly fastening the door hinge to the hinge bracket. However, in a case in which the error and the like of the vehicle width direction occur at the attachment position of the hinge bracket, it is difficult to eliminate (solve) the error and the like of the vehicle width direction because of the structure of the adjusting mechanism of the door hinge.

SUMMARY OF THE INVENTION

Accordingly, an object of the present invention is to provide a door attachment portion structure and a manufacturing method of a door attachment portion of a vehicle which can properly improve the attachment accuracy of the door hinge.

The side vehicle-body structure of the vehicle according to the present invention comprises a pillar member comprising an outer panel and an inner panel which form a closed cross section extending vertically, a door attached to the pillar member via a door hinge, and a hinge bracket for attaching the door hinge to the pillar member, wherein the hinge bracket includes a hinge attachment wall portion, a pair of front-and-rear vertical wall portions, a pair of upper-and-lower lateral wall portions, a pair of front-and-rear vertical flange portions which extend inward in a vehicle width direction from respective inward end portions of the pair of vertical wall portions, an upper lateral flange portion which includes a resiliently-deformable upper resilient portion and extends upward from an inward end portion of the upper lateral wall portion, and a lower lateral flange portion which includes a resiliently-deformable lower resilient portion and extends downward from an inward end portion of the lower lateral wall portion, the pair of vertical flange portions are respectively joined to a front wall portion and a rear wall portion of the pillar member, and the upper lateral flange portion and the lower lateral flange portion are respectively joined to a side wall portion of the pillar member.

According to the present door attachment portion structure of the vehicle, since the pair of vertical flange portions are respectively joined to the front wall portion and the rear wall portion of the pillar member, the pressing direction of the welding device can be directed to the longitudinal direction. Further, since the upper lateral flange portion and the lower flange portion are respectively joined to the side wall portion of the pillar member, the error and the like generated in the vehicle width direction can be absorbed by resilient deformations of the upper resilient portion and the lower resilient portion. Accordingly, the error and the like of the longitudinal direction and the vertical direction can be eliminated by the adjusting mechanism of the door hinge, and the error and the like of the vehicle width direction can be eliminated by the upper resilient portion and the lower resilient portion.

Herein, it is preferable that the above-described pillar member further comprise a pillar reinforcement which is provided in the closed cross section thereof, and the vertical flange portions, the upper lateral flange portion, and the lower lateral flange portion of the above-described hinge bracket be respectively joined to a front wall portion, a rear wall portion, and a side wall portion of the pillar reinforcement.

Also, it is preferable that the above-described upper resilient portion of the upper lateral flange portion be configured by a resiliently-deformable step portion which is formed in a bend shape, and the above-described lower resilient portion of the lower lateral flange portion be configured by a resiliently-deformable step portion which is formed in a bend shape.

Further, it is preferable that the upper lateral flange portion have a smaller (i.e., shorter) longitudinal-length than the lower lateral flange portion.

Moreover, it is preferable that the upper resilient portion of the upper lateral flange portion and the lower resilient portion of the lower lateral flange portion be respectively configured by heat-foaming agents which are interposed between the upper-and-lower lateral flange portions and a side wall portion of the pillar reinforcement.

The side vehicle-body structure of the vehicle according to another aspect of the present invention comprises a pillar member comprising an outer panel and an inner panel which form a closed cross section extending vertically, a door attached to the pillar member via a door hinge, and a hinge bracket for attaching the door hinge to the pillar member, wherein the hinge bracket includes a hinge attachment wall portion, a pair of front-and-rear vertical wall portions, a pair of upper-and-lower lateral wall portions, a pair of front-and-rear vertical flange portions which extend inward in a vehicle width direction from respective inward end portions of the pair of vertical wall portions, and a pair of upper-and-lower lateral flange portions which extend inward in the vehicle width direction from respective inward end portions of the pair of lateral wall portions, a pair of upper-and-lower joint portions which extend inward in the vehicle width direction, corresponding to the pair of lateral flange portions, is provided at the pillar member, the pair of vertical flange portions are respectively joined to a front wall portion and a rear wall portion of the pillar member, and the pair of lateral flange portions are respectively joined to the pair of joint portions.

According to the present door attachment portion structure of the vehicle, since the pair of vertical flange portions are respectively joined to the front wall portion and the rear wall portion of the pillar member, the pressing direction of the welding device can be directed to the longitudinal direction. Further, since the pair of lateral flange portions are respectively joined to the pair of joint portions, the pressing direction of the welding device can be directed to the vertical direction. Accordingly, the error and the like of the longitudinal direction and the vertical direction can be eliminated by the adjusting mechanism of the door hinge, preventing occurrence of the error and the like of the vehicle width direction.

Herein, it is preferable that the above-described pillar member further comprise a pillar reinforcement which is provided in the closed cross section thereof and a hinge gusset which reinforces a support rigidity of the door hinge, the above-described pair of joint portions be provided at the hinge gusset, and the above-descried pair of vertical flange portions of the hinge bracket be respectively joined to a front wall portion and a rear wall portion of the pillar reinforcement, whereas the above-described pair of lateral flange portions be respectively joined to the pair of joint portions of the hinge gusset.

Meanwhile, the present invention is the manufacturing method of the door attachment portion of the vehicle which comprises a pillar member comprising an outer panel and an inner panel which form a closed cross section extending vertically and a door attached to the pillar member via a door hinge, the manufacturing method comprising a first step of preparing a hinge bracket for attaching the door hinge to the pillar member, the hinge bracket including a hinge attachment wall portion, a pair of front-and-rear vertical wall portions, a pair of upper-and-lower lateral wall portions, a pair of front-and-rear vertical flange portions which extend inward in a vehicle width direction from respective inward end portions of the pair of vertical wall portions, an upper lateral flange portion which includes a resiliently-deformable upper resilient portion and extends upward from an inward end portion of the upper lateral wall portion, and a lower lateral flange portion which includes a resiliently-deformable lower resilient portion and extends downward from an inward end portion of the lower lateral wall portion, a second step of respectively joining the pair of vertical flange portions to the front wall portion and the rear wall portion of the pillar member in a state in which the upper lateral flange portion and the lower lateral flange portion are spaced apart from a side wall portion of the pillar member, and a third step of respectively joining the upper lateral flange portion and the lower lateral flange portion to the side wall portion of the pillar member.

According to the present manufacturing method of the door attachment portion of the vehicle, since the pair of vertical flange portions are respectively joined to the front wall portion and the rear wall portion of the pillar member in the state in which the upper lateral flange portion and the lower lateral flange portion are spaced apart from the side wall portion of the pillar member, the pressing direction of the welding device can be directed to the longitudinal direction. Further, since the upper lateral flange portion and the lower flange portion are respectively joined to the side wall portion of the pillar member, the error and the like generated in the vehicle width direction can be absorbed by resilient deformations of the upper resilient portion and the lower resilient portion. Accordingly, the error and the like of the longitudinal direction and the vertical direction can be eliminated by the adjusting mechanism of the door hinge, and the error and the like of the vehicle width direction can be eliminated by the upper resilient portion and the lower resilient portion.

Other features, aspects, and advantages of the present invention will become apparent from the following description which refers to the accompanying drawings.

BRIEF DESCRIPTION OF THE DRAWINGS

FIGS. 7A-7D are views of the hinge bracket for explanation.

DETAILED DESCRIPTION OF THE INVENTION

Hereafter, an embodiment of the present invention will be described specifically referring to the drawings. The following description exemplifies an example in which the present invention is applied to a vehicle, and does not limit the present invention and applications or uses of the present invention. In the figures, an arrow F shows a forward direction and an arrow L shows a leftward direction.

Embodiment 1

A first embodiment of the present invention will be described referring to FIGS. 1-12. As shown in FIGS. 1-5, a vehicle V comprises a pair of right-and-left roof side rails 1 which respectively have a closed cross section and extend in a longitudinal direction at right-and-left both end positions of a vehicle-body upper end portion, a front header 2 which has a closed cross section and interconnects respective front end portions of the pair of roof side rails 1, a pair of right-and-left side sills 3 which respectively have a closed cross section and extend in the longitudinal direction at right-and-left both end positions of a vehicle-body lower end portion, a pair of right-and-left front doors 4 which are respectively provided on the rear side of a pair of right-and-left fender panels, a pair of right-and-left opening portions for front doors 5 which are closable with the pair of right-and-left front doors 4, and a pair of right-and-left opening portions for rear doors (not illustrated) which are closable with a pair of right-and-left rear doors (not illustrated). Herein, since the above-described pairs of right-and-left members are symmetrical, each left-side member will be described mainly.

The opening portion for the front door 5 is formed by a front pillar 6 and a hinge pillar 10 which form a front edge together, a center pillar which forms a rear edge, a front-end side portion of a roof side rail 1 which connects an upper end portion of the front pillar 6 and an upper end portion of the center pillar, and a front-end side portion of the side sill 3 which connects a lower end portion of the hinge pillar 10 and a lower end portion of the enter pillar 7. The front pillar 6 has a closed cross section which is formed by a front pillar outer and a front pillar inner and slants downward and forward.

Next, the hinge pillar 10 will be described. The hinge pillar 10 is configured such that its lower-end side portion faces a front wheel 9, and pivotally supports the front door via a pair of upper-and-lower door hinges 7. An upper end portion of the hinge pillar 10 is joined to a lower end portion of the front pillar 6 so that the respective closed cross sections of the both pillars 6, 10 are continuous to each other in a vertical direction. Thus, the closed cross section of the front pillar 6 is continuous to the closed cross sections of the roof side rail 1 and the front header 2 and the closed cross section of the hinge pillar 10 is continuous to the closed cross section of the side sill 3, so that there is provided a ring-shaped closed-cross section structure around the opening portion for the front door 5.

As shown in FIGS. 2-6, the hinge pillar 10 which extends roughly vertically downward from a lower end portion of the front pillar 6 comprises an outer panel 11, an inner panel 12 which forms the vertically-extending closed cross section together with the outer panel 11, a hinge pillar reinforcement 13 which reinforces the rigidity of the hinge pillar 10, an upper-side hinge gusset 14a which reinforces the support rigidity of the upper-side door hinge 7, a lower-side hinge gusset 14b which reinforces the support rigidity of the lower-side door hinge 7, a hinge bracket 15 which attaches the lower-side door hinge 7 to the hinge pillar reinforcement 13, and others.

Figure 1:
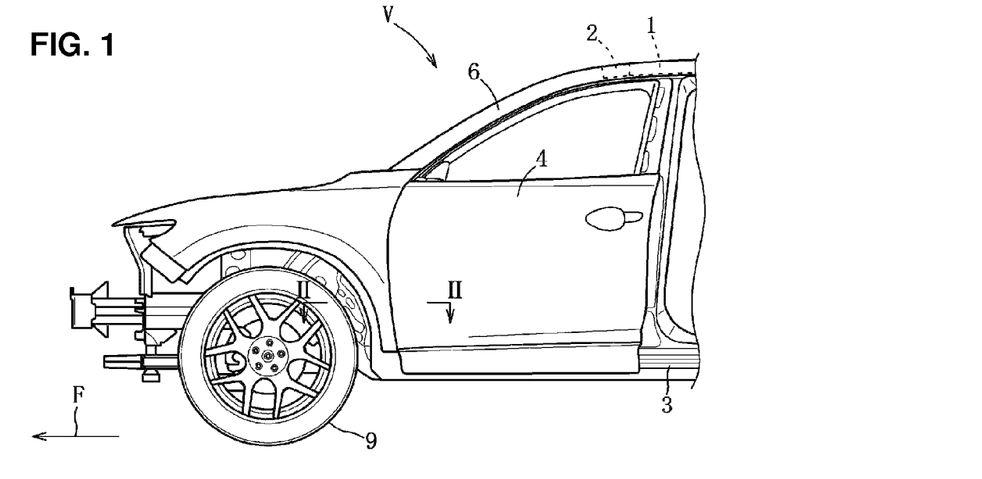
FIG. 1 is a side view of a vehicle-body front portion according to a first embodiment of the present invention, when viewed from a left side of a vehicle.
Figure 2:
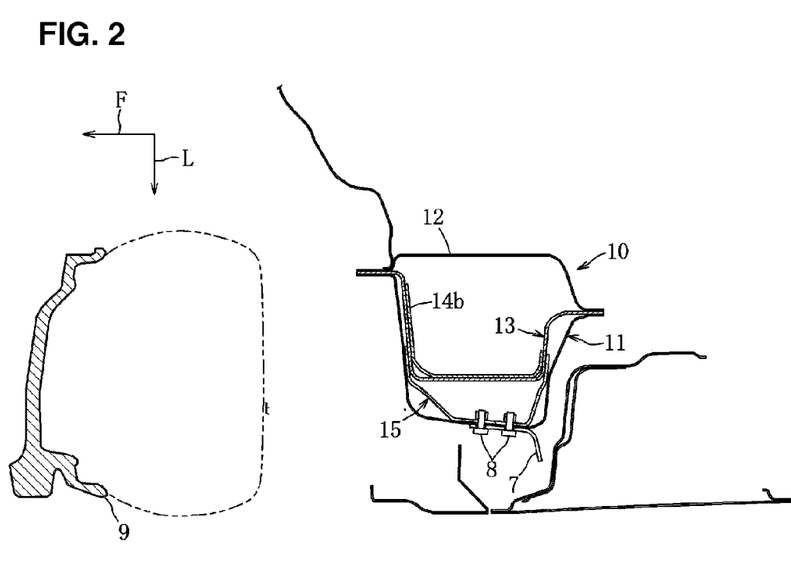
FIG. 2 is a side view taken along line II-II of FIG. 1.
Figure 3:
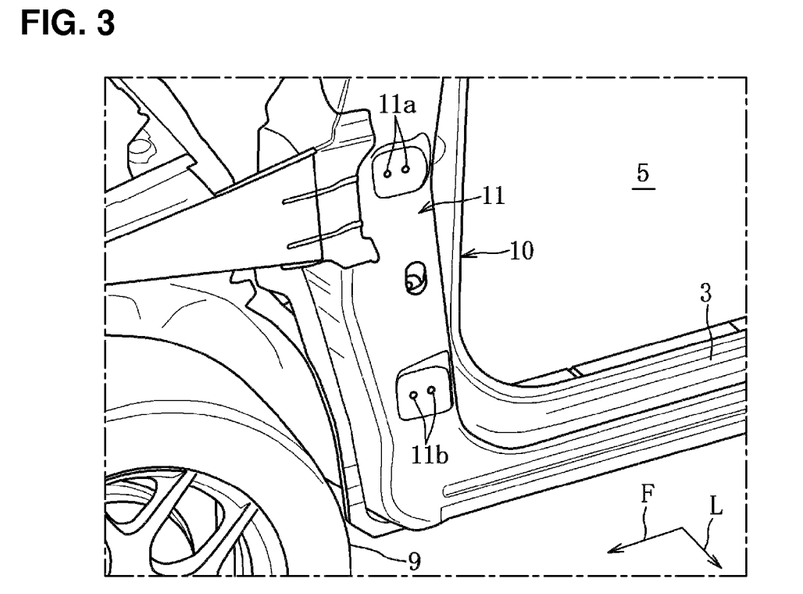
FIG. 3 is a major-part perspective view of FIG. 1.

As shown in FIG. 2, the outer panel 11 is formed by a portion of a front-end side portion of a side panel outer which forms a vehicle-body outer wall. This outer panel 11 has a roughly hat-shaped cross section which is configured to protrude leftward such that a side wall portion formed at a left end thereof is positioned on a left side of the center, in the vehicle width direction, of the front wheel 9 directed to a straight-forward direction and on a right side of a left end portion of the front wheel 9 directed to the straight-forward direction. As shown in FIG. 3, at the outer panel 11 are formed a pair of front-and-rear upper-side bolt holes 11a and a pair of front-and-rear lower-side bolt holes 11b at an upper-end side portion and a lower-end side portion of its side wall portion which respectively correspond to the both door hinges 7. The upper-side bolt holes 11a and the lower-side bolt holes 11b are located at the same position (on the same vertical face) in the vehicle width direction in a front view (i.e., when viewed from the front).

As shown in FIG. 2, the inner panel 12 has a roughly hat-shaped cross section which is configured to slightly protrude rightward such that a side wall portion formed at a right end thereof is positioned on a left side of a right end portion of the front wheel 9 directed to the straight-forward direction. Both flange portions formed at a front end portion and a rear end portion of the inner panel 12 are respectively joined to both flange portions formed at a front end portion and a rear end portion of the outer panel 11, so that the closed cross section extending vertically is formed.

The hinge pillar reinforcement 13 which vertically extends and has the roughly hat-shaped cross section protruding leftward is arranged in the closed cross section of the hinge pillar 10. This hinge pillar reinforcement 13 is made from high tension steel which has a specified tensile strength or greater through pressing. Front and rear flange portions of the hinge pillar reinforcement 13 which are respectively formed at its front and rear end portions are interposed between and welded to the respective front and rear flange portions of the outer panel 11 and the inner panel 12.

Figure 4:
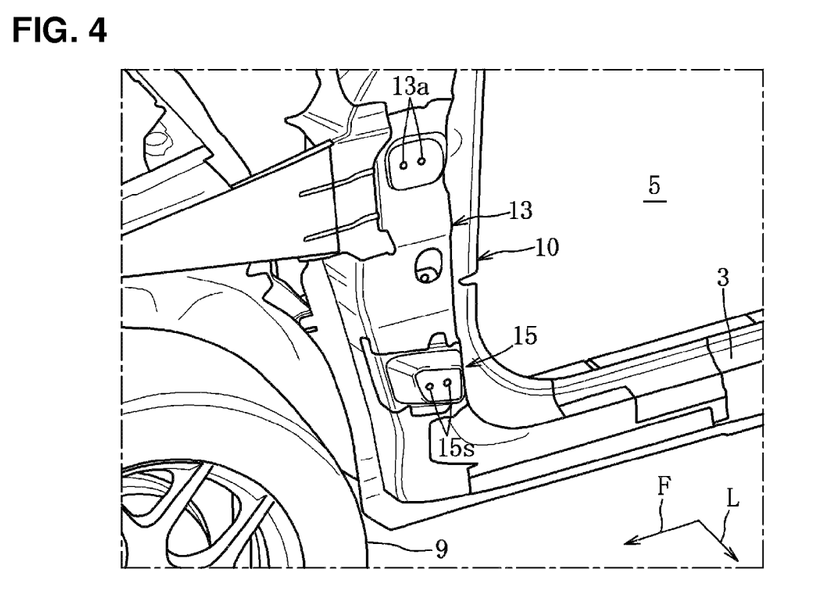
FIG. 4 is a major-part perspective view of FIG. 3, omitting illustration of an outer panel.
Figure 6:
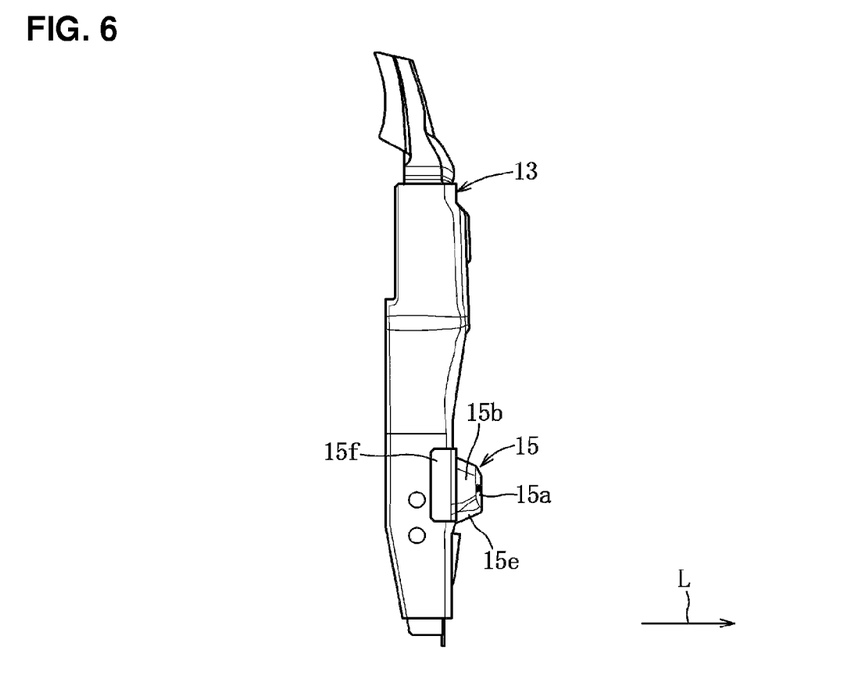
FIG. 6 is a front view of the hinge pillar reinforcement and a hinge bracket.
Figure 7A:
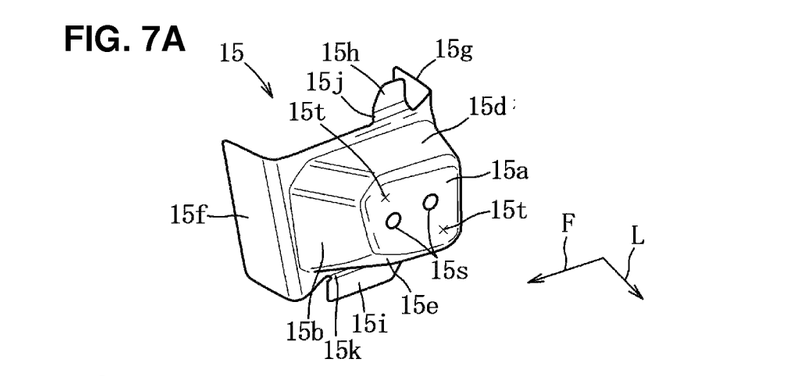
FIG. 7A being a perspective view.
Figure 7B:
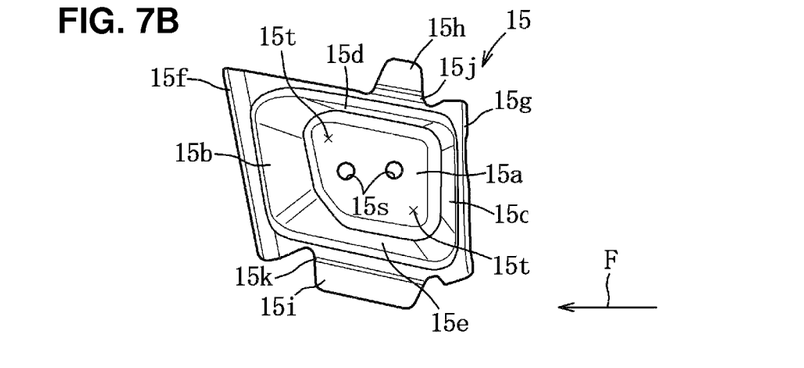
FIG. 7B being a side view.
Figure 7C:
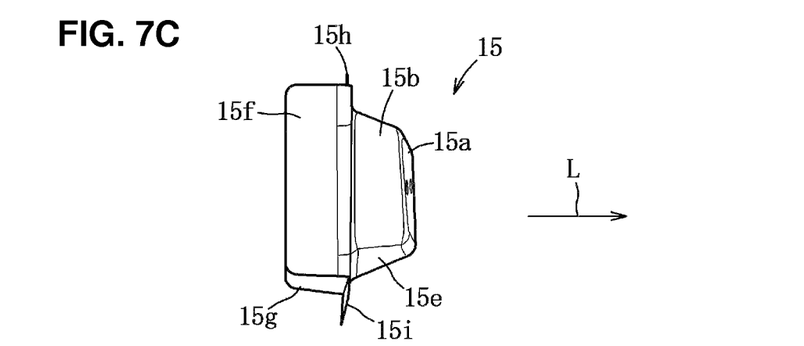
FIG. 7C being a front view.
Figure 7D:
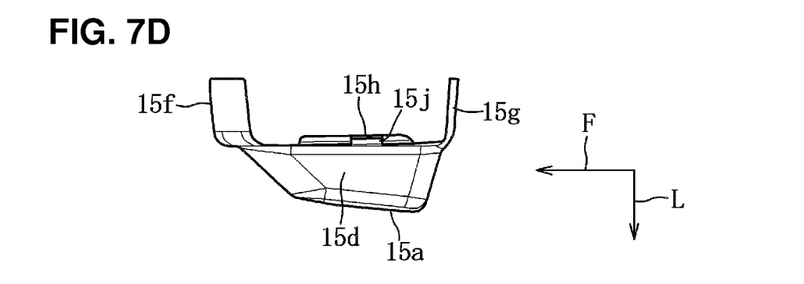
FIG. 7D being a plan view.

As shown in FIG. 6, the hinge pillar reinforcement 13 is configured such that a lateral length of its lower-half portion is shorter than that of its upper-half portion by a specified length in the front view (when viewed from the front). As shown in FIG. 4, a side wall portion of the upper-half portion has a pair of bolt holes 13a which are formed at front and rear positions which correspond to the above-described pair of upper-side bolt holes 11a, and is joined to the side wall portion of the outer panel 11. A side wall portion of the lower-half portion is configured to partition the closed cross section of the hinge pillar 10 into an outward part and an inward part, and has a pair of front-and-rear welding holes 13b (see FIG. 10) for welding the hinge bracket 15 to a back face of the side wall portion of the outer panel 11.

Figure 5:
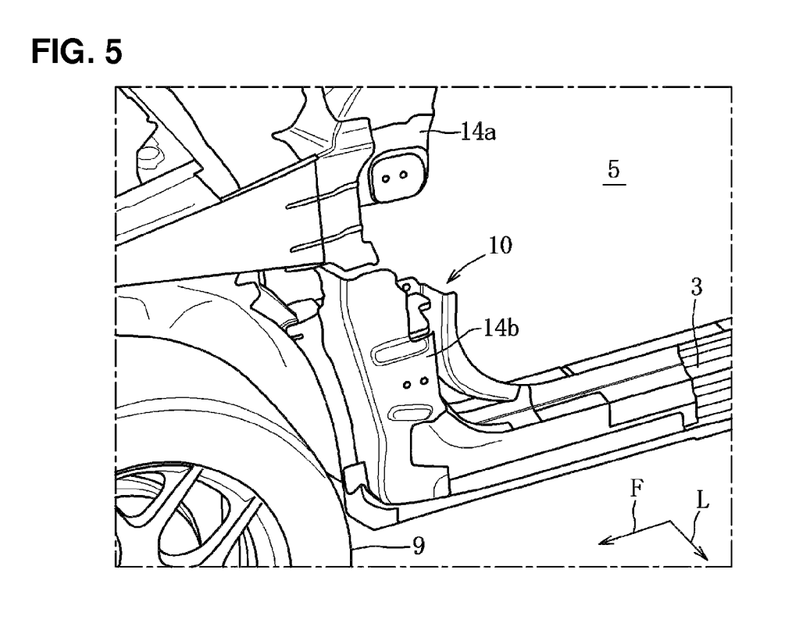
FIG. 5 is a major-part perspective view of FIG. 4 in a state in which illustration of a hinge pillar reinforcement is omitted.

As shown in FIGS. 2 and 5, an upper-side hinge gusset 14a and a lower-side hinge gusset 14b which have a roughly U-shaped cross section are arranged between the hinge pillar reinforcement 13 and the inner panel 12. The hinge gussets 14a, 14b are made from high tension steel through pressing, and joined to the hinge pillar reinforcement 13, corresponding to the upper- and lower door hinges 7. Herein, the hinge gussets 14a, 14b may be made as a single piece.

Next, the hinge bracket 15 will be described. Between the lower-half portion of the hinge pillar reinforcement 13 and the outer panel 11 is arranged the hinge bracket 15. This hinge bracket 15 is made of a steel plate which has a relatively low strength, compared to the hinge pillar reinforcement 13, such as a soft steel plate, and formed in a partially quadrangular-pyramid shape through pressing. As shown in FIGS. 7A-7D and 8, the hinge bracket 15 comprises a hinge-attachment wall portion 15a, a pair of front-and-rear vertical wall portions 15b, 15c, a pair of upper-and-lower lateral wall portions 15d, 15e, a pair of front-and-rear vertical flange portions 15f, 15g, an upper lateral flange portion 15h, a lower lateral flange portion 15i, and others.

The hinge attachment wall portion 15a is configured to have a face contact with the outer panel 11, and a pair of bolt holes 15s which are located longitudinally side by side are formed at this hinge-attachment wall portion 15a at positions which correspond to the lower-side bolt holes 11b of the outer panel 11. Further, a pair of joint portions 15t are formed on the hinge-attachment wall portion 15a at positions which correspond to the pair of welding holes 13b of the hinge pillar reinforcement 13, and these joint portions 15t are joined to a back face of the side wall portion of the outer panel 11 by welding. The front-side joint portion 15t is arranged above the front-side bolt hole 15s and the rear-side joint portion 15t is arranged below the rear-side bolt hole 15s, so that the hinge-attachment wall portion 15a is formed in a roughly parallelogram shape in the side view, thereby improving the area minimization and the pressing workability.

The front vertical wall portion 15b is provided to face the upper-half portion of the front wheel 9 in the longitudinal direction from behind. This front vertical wall portion 15b extends inward and forward from a front end portion of the hinge-attachment wall portion 15a, and is configured to slant downward and rearward in the side view and also slant leftward and rearward in the plan view. The rear vertical wall portion 15c extends inward and rearward from a rear end portion of the hinge-attachment wall portion 15a, and is configured to slant leftward and forward in the plan view. The lateral wall portion 15d extends inward and upward from an upper end portion of the hinge attachment wall portion 15a, and is configured to slant rearward and downward. The lower lateral wall portion 15e extends inward and downward from a lower end portion of the hinge-attachment wall portion 15a, and is configured to slant rearward and downward.

The front vertical flange portion 15f extends rightward roughly in parallel to the front wall portion of the hinge pillar reinforcement 13 from a right end (front end) of the front vertical wall portion 15b, and is joined to the front wall portion of the hinge pillar reinforcement 13 by welding. The rear vertical flange portion 15g extends rightward roughly in parallel to the rear wall portion of the hinge pillar reinforcement 13 from a right end (rear end) of the rear vertical wall portion 15c, and is joined to the rear wall portion of the hinge pillar reinforcement 13 by welding.

Figure 8:
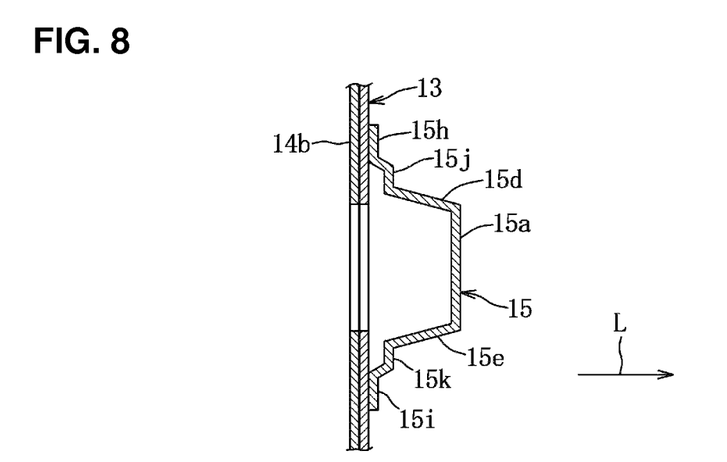
FIG. 8 is a vertical sectional view of the hinge bracket.
Figure 9:
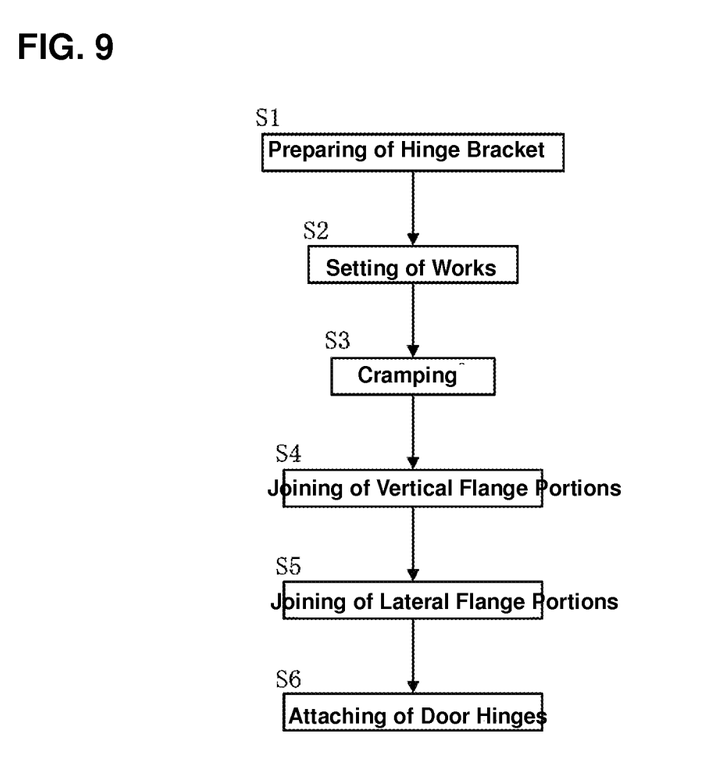
FIG. 9 is a flowchart showing manufacturing steps of a door attachment portion.

As shown in FIG. 8, the upper lateral flange portion 15h extends upward from a right end (upper end) of the upper lateral wall portion 15d via an upper step portion 15j (an upper resilient portion), and is joined to the side wall portion of the hinge pillar reinforcement 13. This upper step portion 15j is formed in a bend shape and configured to be resiliently deformable in a lateral direction. The lower lateral flange portion 15i extends downward from a right end (lower end) of the lower lateral wall portion 15e via a lower step portion 15k (a lower resilient portion), and is joined to the side wall portion of the hinge pillar reinforcement 13. This lower step portion 15k is formed in a bend shape and configured to be resiliently deformable in the lateral direction. The upper lateral flange portion 15h is configured to have a longitudinal length that is shorter than that of the lower lateral flange portion 15i, thereby providing both the light weight and the attachment strength.

Next, manufacturing steps of the door attachment portion will be described referring to a flowchart of FIG. 9 and FIGS. 1-12. Herein, reference characters Si (i=1, 2, . . . ) show steps for respective working processes. First, the above-described hinge bracket 15 is prepared in step S1. Since the hinge bracket 15 and the hinge reinforcement 13 are separate parts, these two members are formed separately from each other at different working (processing) stations and then supplied to a welding station.

Figure 10:
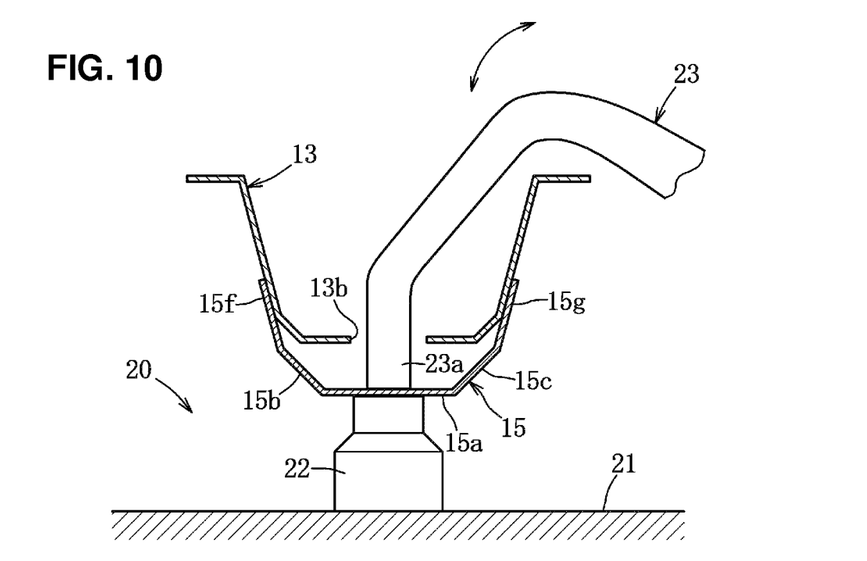
FIG. 10 is a side view showing the hinge bracket and the hinge reinforcement in a cramp step.

As shown in FIG. 10, at the welding station are arranged a spot welding device (not illustrated) and a welding tool 20. The welding tool 20 comprises a jig bed 21 which becomes an absolute standard in a vehicle-body assembling, a standard body 22 which is arranged on the jig bed 21, a cramp arm 23 which is operated by an extensible cramp cylinder (not illustrated) so as to cramp a work together with the standard body 22, and others. The hinge bracket 15 and the hinge pillar reinforcement 13 are set on the standard body 22 after positioning (step S2).

Figure 11:
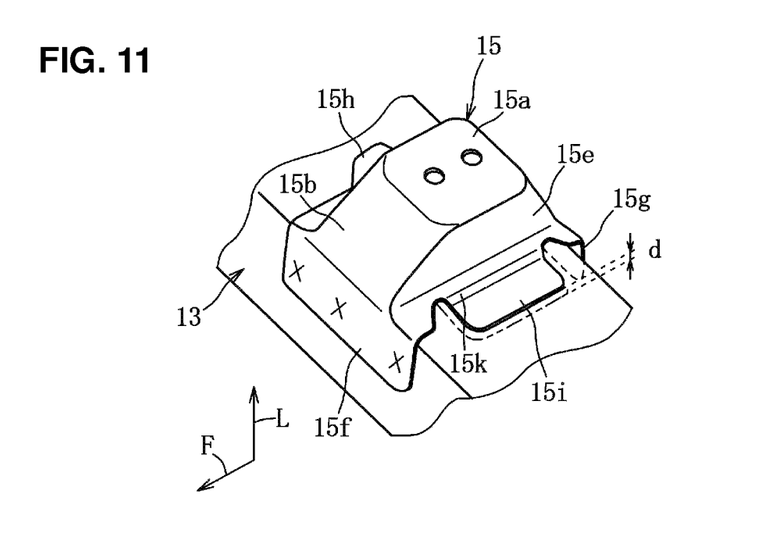
FIG. 11 is a perspective view showing the hinge bracket and the hinge reinforcement in a joining step of a vertical flange portion.

In the next step S3, the cramp arm 23 is rotated toward the standard body 22 through an operation of the cramp cylinder. A cramp portion 23a comes into the welding hole 13b of the hinge pillar reinforcement 13 and then cramps the hinge bracket 15 in its positioning state. As shown in FIG. 11, the hinge bracket 15 and the hinge pillar reinforcement 13 are arranged (i.e., positioning of these members 13, 15 is conducted) such that the upper lateral flange portion 15h and the lower lateral flange portion 15i are respectively spaced apart from the side wall portion of the hinge pillar reinforcement 13 by a small distance d after the positing of the hinge bracket 15 and the hinge pillar reinforcement 13 is complete. After the cramping is complete, the front vertical flange portion 15f and the rear vertical flange portion 15g are respectively spot-welded to the front wall portion and the rear wall portion of the hinge pillar reinforcement 13 by using the spot welding device (step S4).

Next, the upper lateral flange portion 15h and the lower lateral flange portion 15i are respectively joined to the side wall portion of the hinge pillar reinforcement 13 by using the spot welding device (step S5). Since the upper lateral flange portion 15h and the lower lateral flange portion 15i are spaced apart from the side wall portion of the hinge pillar reinforcement 13 by the small distance d, the lateral flange portions 15h, 15i are respectively pressed toward the hinge pillar reinforcement 13 (inward in the vehicle width direction) through the pressing operation of the electrodes of the spot welding device at the welding. Herein, since the upper step portion 15j and the lower step portion 15k are resiliently deformable toward the hinge pillar reinforcement 13, the deformation of the pressing direction by the spot welding device can be absorbed by the resilient deformation, and the deformation of the anti-pressing direction can be absorbed by the resilient deformation, so that occurrence of a deformation difference between the deformation of the pressing direction and the deformation of the anti-pressing direction can be prevented. Herein, respective joining forces of the upper lateral flange portion 15h and the lower lateral flange portion 15i and respective joining force of the front vertical flange portion 15f and the rear flange portion 15g are set to be higher than a returning force of the upper step portion 15j and the lower step portion 15k.

A side frame assembly which comprises the hinge pillar reinforcement 13 with the hinge bracket 15 joined thereto, the side panel outer, and others is supplied (carried) to an assembly station. After the side frame assembly is assembled to an under body with the jig bed 21 as the assembling standard, the pair of upper-and-lower door hinges 7 which are previously attached to the front door 4 are assembled to the hinge pillar 10 through position adjusting (step S6).

Figure 12:
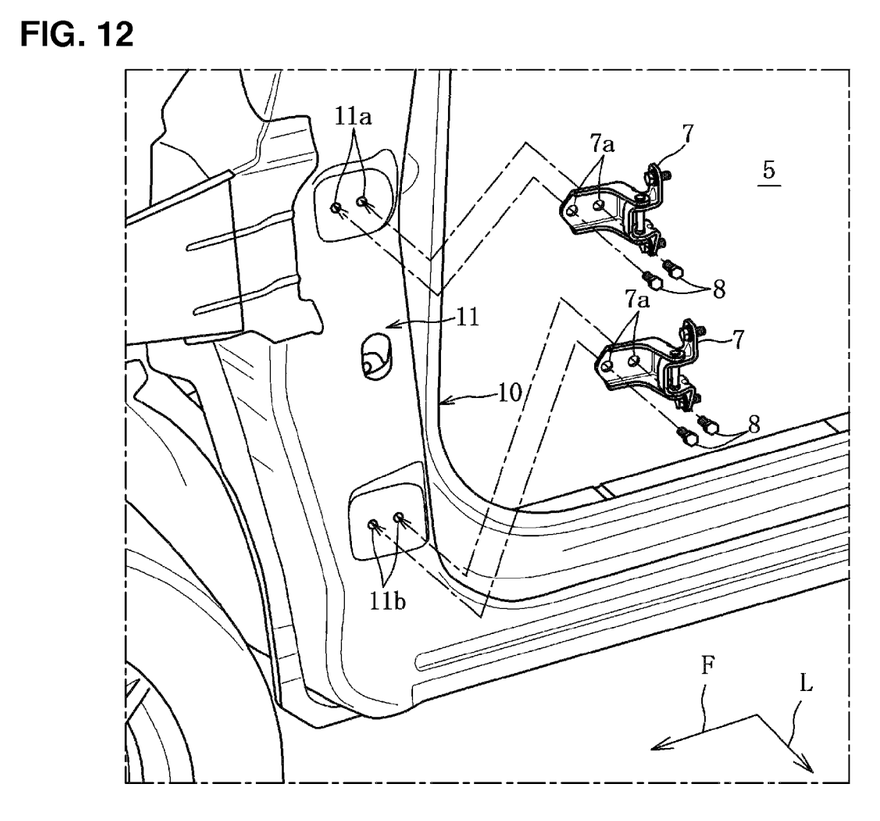
FIG. 12 is an exploded perspective view of a hinge pillar and a door hinge.

As shown in FIGS. 2 and 12, the upper door hinge 7 is fixedly fastened to the upper bolt hole 13a by a pair of front-and-rear bolts 8 which are inserted into the upper bolt holes 11a, and the lower door hinge 7 is fixedly fastened to the upper bolt hole 15s by a pair of front-and-rear bolts 8 which are inserted into the lower bolt holes 11b. Herein, an inner diameter of a pair of front-and-rear bolt holes 7a of the door hinges 7 is configured to be slightly larger than an outer diameter of the pair of front-and-rear bolts 8, which corresponds to an adjusting mechanism of the door hinges 7. A positional adjustment of the error and others of the longitudinal direction and the vertical direction of the front door 4 relative to the vehicle-body side can be attained by this adjusting mechanism.

Hereafter, operations and effects of the above-described door attachment portion structure and door attachment portion manufacturing method of the vehicle V will be described.

According to the door attachment portion structure of the vehicle V, since the pair of vertical flange portions 15f, 15g are respectively joined to the front wall portion and the rear wall portion of the hinge pillar reinforcement 13, the pressing direction of the spot welding device can be directed to the longitudinal direction. Further, since the upper lateral flange portion 15h and the lower flange portion 15i are respectively joined to the side wall portion of the hinge pillar reinforcement 13, the error and the like generated in the vehicle width direction can be absorbed by resilient deformations of the upper step portion 15j and the lower step portion 15k. Accordingly, the error and the like of the longitudinal direction and the vertical direction can be eliminated by the adjusting mechanism of the door hinges 7, and the error and the like of the vehicle width direction can be eliminated by the upper step portion 15j and the lower step portion 15k.

According to the manufacturing method of the door attachment portion of the vehicle V, since the pair of front-and-rear vertical flange portions 15f, 15g are respectively joined to the front wall portion and the rear wall portion of the hinge pillar reinforcement 13 in the state in which the upper lateral flange portion 15h and the lower lateral flange portion 15i are spaced apart from the side wall portion of the hinge pillar reinforcement 13, the pressing direction of the welding device can be directed to the longitudinal direction. Further, since the upper lateral flange portion 15h and the lower flange portion 15i are respectively joined to the side wall portion of the hinge pillar reinforcement 13, the error and the like generated in the vehicle width direction can be absorbed by resilient deformations of the upper step portion 15j and the lower step portion 15k. Accordingly, the error and the like of the longitudinal direction and the vertical direction can be eliminated by the adjusting mechanism of the door hinges 7, and the error and the like of the vehicle width direction can be eliminated by the upper step portion 15j and the lower step portion 15k.

Embodiment 2

A door attachment portion structure according to a second embodiment will be described referring to FIGS. 13 and 14. While the hinge bracket 15 of the above-described first embodiment is configured such that the upper lateral flange portion 15h extends upward via the upper step portion 15j and the lower lateral flange portion 15i extends downward via the lower step portion 15k, a hinge bracket 15A of the second embodiment is configured such that a pair of upper-and-lower lateral flange portions 15m, 15n respectively extend inward in the vehicle width direction. Herein, the same structural elements as the first embodiment are denoted by the same reference characters.

Figure 13:
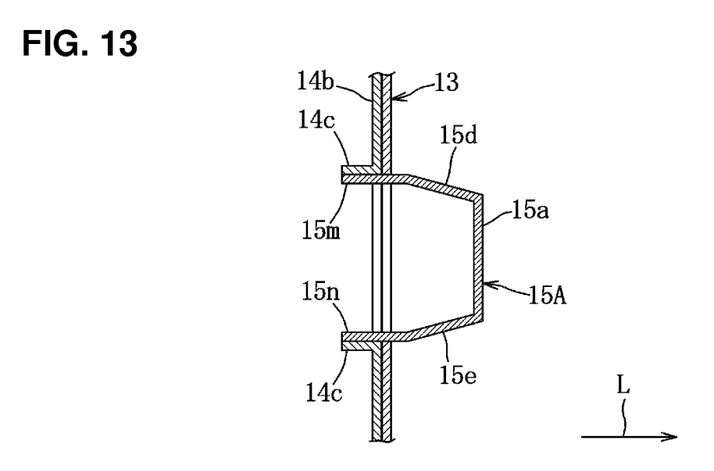
FIG. 13 is a vertical sectional view of a hinge bracket according to a second embodiment of the present invention.
Figure 14:
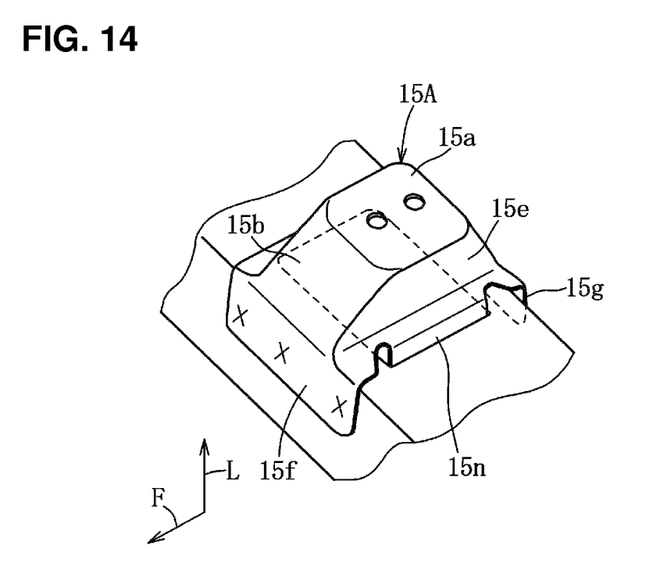
FIG. 14 is a view corresponding to FIG. 11.

As shown in FIGS. 13 and 14, the hinge bracket 15A comprises a hinge attachment wall portion 15a, a pair of front-and-rear vertical wall portions 15b, 15c, a pair of upper-and-lower lateral wall portions 15d, 15e, a pair of front-and-rear vertical flange portions 15f, 15g, a pair of upper-and-lower lateral flange portions 15m, 15n, and others. The upper lateral flange portion 15m extends rightward from a right end of the upper lateral wall portion 15d, and the lower lateral flange portion 15n extends rightward from a right end of the lower lateral wall portion 15e.

The lower-side hinge gusset 14b has a pair of upper-and-lower joint portions 14c. The pair of joint portions 14c are respectively provided at a position corresponding to a joint position of the hinge bracket 15A (the lateral flange portions 15m, 15n) and extend rightward roughly horizontally. When the hinge bracket 15a is joined to the hinge pillar reinforcement 13, the front vertical flange portion 15f and the rear vertical flange portion 15g are respectively spot-welded to the front wall portion and the rear wall portion of the hinge pillar reinforcement 13 by using the spot welding device, and then the pair of lateral flange portions 15m, 15n are respectively spot-welded to the pair of upper-and-lower joint portions 14c.

According to the present door attachment portion structure of the vehicle V, since the pair of vertical flange portions 15f, 15g are respectively joined to the front wall portion and the rear wall portion of the hinge pillar reinforcement 13, the pressing direction of the spot welding device can be directed to the longitudinal direction. Further, since the pair of lateral flange portions 15*m*, 15*n* are respectively joined to the pair of joint portions 14*c*, the pressing direction of the spot welding device can be directed to the vertical direction. Accordingly, the error and the like of the longitudinal direction and the vertical direction can be eliminated by the adjusting mechanism of the door hinges 7, preventing the error and the like of the vehicle width direction without using any damping mechanism, such as the step portion.

Next, some modifications of the above-described embodiments will be described.

Figure 15:
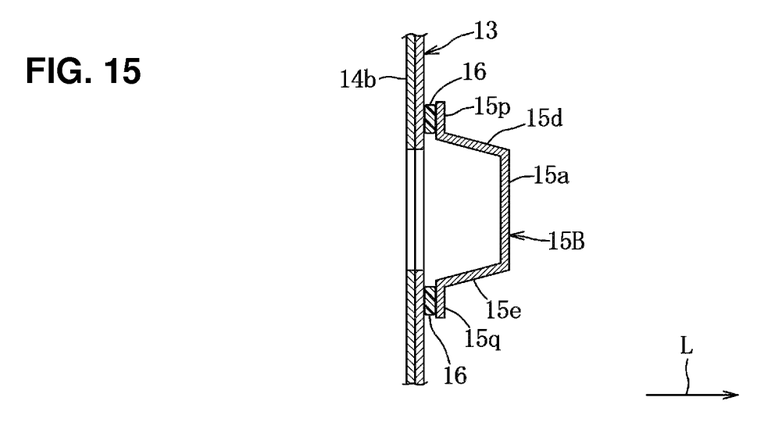
FIG. 15 is a vertical sectional view of a hinge bracket according to a modification.
Figure 16:
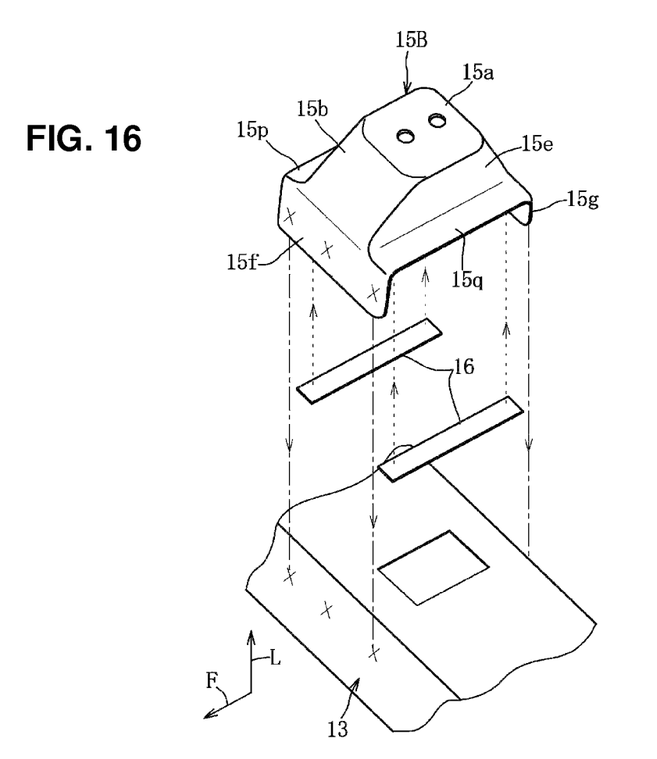
FIG. 16 is an exploded perspective view of the hinge bracket.

1) While the above-described first embodiment shows an example in which the resilient portion is formed by the step portion which is integrally provided between the lateral wall portion and the lateral flange portion, the resilient portion may be formed by a heat-foaming agent without forming this step portion. In this modification, as shown in FIGS. 15 and 16, a hinge bracket 15B comprises a hinge attachment wall portion 15*a*, a pair of front-and-rear vertical wall portions 15*b*, 15*c*, a pair of upper-and-lower lateral wall portion 15*d*, 15*e*, a pair of front-and-rear vertical flange portions 15*f*, 15*g* which respectively extend inward from inward end portions, in the vehicle width direction, of the pair of vertical wall portions 15*b*, 15*c*, an upper lateral flange portion 15*p* which extends upward from an inward end portion, in the vehicle width direction, of the upper lateral wall portion 15*d*, and a lower lateral flange portion 15*q* which extends downward from an inward end portion, in the vehicle width direction, of the lower lateral wall portion 15*e*. A heat-foaming agent 6 is interposed between the lateral flange portions 15*p*, 15*q* and the side wall portion of the hinge pillar reinforcement 13.

When the hinge bracket 15B is joined to the hinge pillar reinforcement 13, the sheet-shaped heat-foaming agents 16 in a non-foamed state are adhesively attached to the lateral flange portions 15*p*, 15*q*, and then the front vertical flange portion 15*f* and the rear vertical flange portion 15*g* are respectively spot-welded to the front wall portion and the rear wall portion of the hinge pillar reinforcement 13 by using the spot welding device. Next, the heat-foaming agents 16 are made to foam by heat which is generated in a coat-drying step, resulting in adhesion of the lateral flange portions 15*p*, 15*q* and the side wall portion of the hinge pillar reinforcement 13. Accordingly, it can be attained to properly simplify the structure and the welding process of the hinge bracket 15B.

2) While the above-described first embodiment shows an example in which the hinge bracket is joined to the hinge pillar reinforcement, any member is applicable in forming the hinge pillar. A structure in which the hinge bracket is joined to the outer panel of the hinge pillar can provide the same effects. Further, while the above-described embodiments show an example of the door attachment portion of the front door, the present invention is applicable to a door attachment portion of a rear door. In this case, a hinge bracket for the rear door is joined to an outer panel of a center pillar or a center pillar reinforcement.

3) While the above-described second embodiment shows an example in which a pair of upper-and-lower joint portions extending in the vehicle width direction are provided at the lower-side hinge gusset, the pair of upper-and-lower joint portions extending in the vehicle width direction may be provided at the hinge pillar reinforcement.

4) The present invention should not be limited to the above-described embodiments, and any other modifications or improvements may be applied within the scope of a spirit of the present invention.

What is claimed is:

1. A door attachment portion structure of a vehicle, comprising:

a pillar member comprising an outer panel and an inner panel which form a closed cross section extending vertically and a pillar reinforcement which is provided in the closed cross section formed by the outer panel and the inner panel;

a door attached to the pillar member via a door hinge; and a hinge bracket attaching the door hinge to the pillar reinforcement of the pillar member, the hinge bracket being arranged between the outer panel and the pillar reinforcement, wherein said hinge bracket includes a hinge attachment wall portion, a pair of front-and-rear vertical wall portions, a pair of upper-and-lower lateral wall portions, a pair of front-and-rear vertical flange portions which extend inward in a vehicle width direction from respective inward end portions of the pair of vertical wall portions, an upper lateral flange portion which includes a vehicle-width-direction resiliently-deformable upper resilient portion and extends upward from an inward end portion of the upper lateral wall portion, and a lower lateral flange portion which includes a vehicle-width-direction resiliently-deformable lower resilient portion and extends downward from an inward end portion of the lower lateral wall portion, said pair of vertical flange portions are respectively joined to a front wall portion and a rear wall portion of said pillar reinforcement of the pillar member in a state in which said hinge attachment wall portion contacts a back face of said outer panel of the pillar member, and said upper lateral flange portion and said lower lateral flange portion are respectively joined to a side wall portion of said pillar reinforcement which is provided between the front wall portion and the rear wall portion of said pillar reinforcement of the pillar member.

2. The door attachment portion structure of the vehicle of claim 1, wherein said upper resilient portion of the upper lateral flange portion is configured by a vehicle-width-direction resiliently-deformable step portion which is formed in a bend shape, and said lower resilient portion of the lower lateral flange portion is configured by a vehicle-width-direction resiliently-deformable step portion which is formed in a bend shape.

3. The door attachment portion structure of the vehicle of claim 1, wherein said upper lateral flange portion has a smaller longitudinal-length than said lower lateral flange portion.

4. The door attachment portion structure of the vehicle of claim 2, wherein said upper lateral flange portion has a smaller longitudinal-length than said lower lateral flange portion.

5. The door attachment portion structure of the vehicle of claim 1, wherein said vehicle-width-direction resiliently-deformable upper resilient portion of the upper lateral flange portion and said vehicle-width-direction resiliently-deformable lower resilient portion of the lower lateral flange portion of the hinge bracket are respectively configured by heat-foaming agents which are interposed between the upper-and-lower lateral flange portions and the side wall portion of said pillar reinforcement of the pillar member, and the upper lateral flange portion and the lower lateral flange portion are respectively joined to the side wall portion of the pillar reinforcement of the pillar member via said heat-foaming agents.

6. A door attachment portion structure of a vehicle, comprising:
- a pillar member comprising an outer panel and an inner panel which form a closed cross section extending vertically and a pillar reinforcement which is provided in the closed cross section formed by the outer panel and the inner panel;
- a door attached to the pillar member via a door hinge; and
- a hinge bracket attaching the door hinge to the pillar reinforcement of the pillar member, the hinge bracket being arranged between the outer panel and the pillar reinforcement,
- wherein said hinge bracket includes a hinge attachment wall portion, a pair of front-and-rear vertical wall portions, a pair of upper-and-lower lateral wall portions, a pair of front-and-rear vertical flange portions which extend inward in a vehicle width direction from respective inward end portions of the pair of vertical wall portions, and a pair of upper-and-lower lateral flange portions which extend inward in the vehicle width direction from respective inward end portions of the pair of lateral wall portions,
- a pair of upper-and-lower joint portions which extend inward in the vehicle width direction, corresponding to said pair of lateral flange portions of the hinge bracket, is provided at said pillar member behind said pillar reinforcement,
- said pair of vertical flange portions are respectively joined to a front wall portion and a rear wall portion of said pillar reinforcement of the pillar member in a state in which said hinge attachment wall portion of the hinge bracket contacts a back face of said outer panel of the pillar member, and
- said pair of lateral flange portions of the hinge bracket are respectively joined to said pair of joint portions of the pillar member, penetrating a side wall portion of said pillar reinforcement which is provided between the front wall portion and the rear wall portion of said pillar reinforcement.

7. The door attachment portion structure of the vehicle of claim 6, wherein said pillar member further comprises a hinge gusset which is provided behind said pillar reinforcement and reinforces a support rigidity of the door hinge, and said pair of joint portions are provided at said hinge gusset, whereas said pair of lateral flange portions of the hinge bracket are respectively joined to said pair of joint portions of the hinge gusset.

8. A manufacturing method of a door attachment portion of a vehicle which comprises a pillar member comprising an outer panel and an inner panel which form a closed cross section extending vertically, a pillar reinforcement which is provided in the closed cross section formed by the outer panel and the inner panel, and a door attached to the pillar member via a door hinge, the manufacturing method comprising:
- a first step of preparing a hinge bracket to attach the door hinge to the pillar reinforcement of the pillar member, the hinge bracket being provided between the outer panel and the pillar reinforcement, the hinge bracket including a hinge attachment wall portion, a pair of front-and-rear vertical wall portions, a pair of upper-and-lower lateral wall portions, a pair of front-and-rear vertical flange portions which extend inward in a vehicle width direction from respective inward end portions of the pair of vertical wall portions, an upper lateral flange portion which includes a vehicle-width-direction resiliently-deformable upper resilient portion and extends upward from an inward end portion of the upper lateral wall portion, and a lower lateral flange portion which includes a vehicle-width-direction resiliently-deformable lower resilient portion and extends downward from an inward end portion of the lower lateral wall portion;
- a second step of respectively joining said pair of vertical flange portions to a front wall portion and a rear wall portion of said pillar reinforcement of the pillar member in a state in which said upper lateral flange portion and said lower lateral flange portion of the hinge bracket are spaced apart from a side wall portion of said pillar reinforcement which is provided between said front wall portion and said rear wall portion of the pillar reinforcement of the pillar member; and
- a third step of respectively joining said upper lateral flange portion and said lower lateral flange portion to said side wall portion of the pillar reinforcement of the pillar member, pressing down the upper lateral flange portion and the lower lateral flange portion in accordance with resilient deformation, in the vehicle width direction, of said upper-and-lower resilient portions, the third step being conducted after said second step.

9. The door attachment portion structure of the vehicle of claim 8, wherein said upper resilient portion of the upper lateral flange portion is configured by a vehicle-width-direction resiliently-deformable step portion which is formed in a bend shape, and said lower resilient portion of the lower lateral flange portion is configured by a vehicle-width-direction resiliently-deformable step portion which is formed in a bend shape.

* * * * *